Patented Mar. 5, 1946

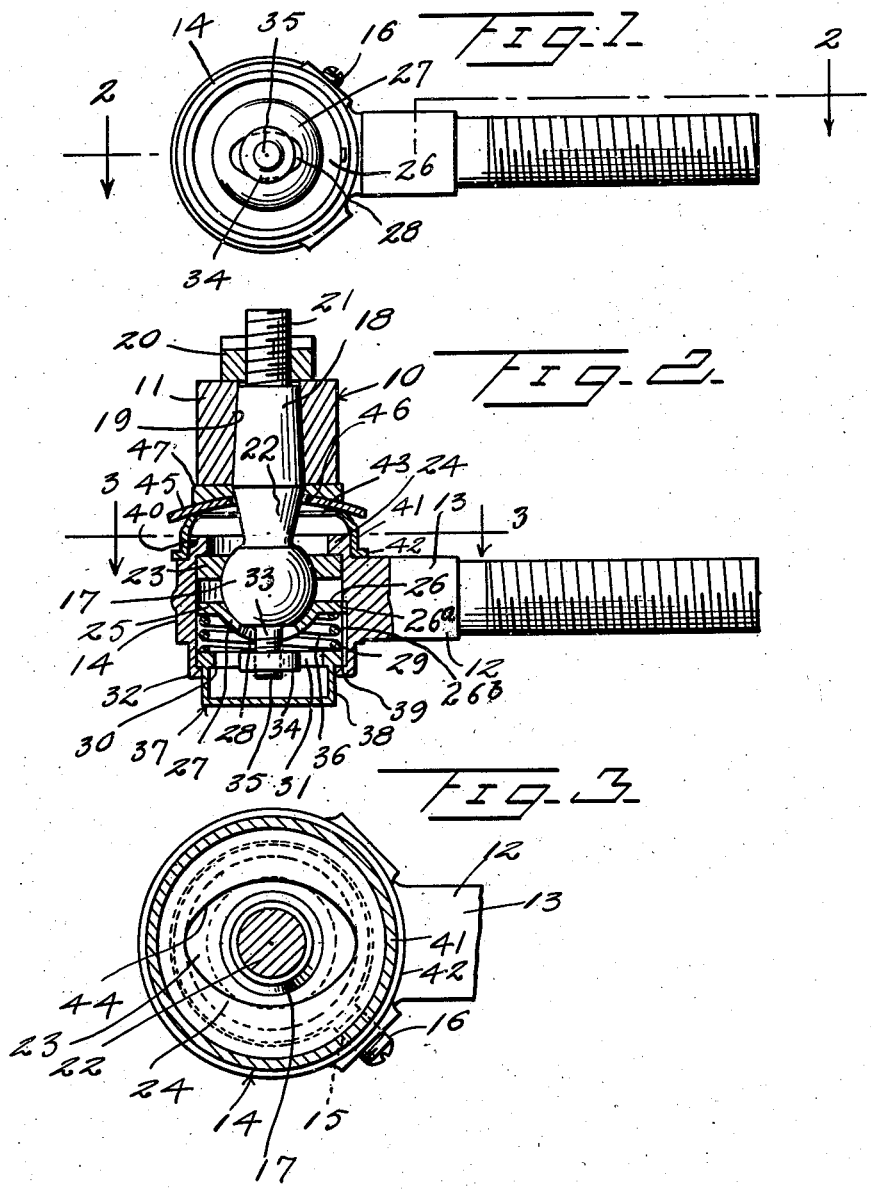

2,396,151

UNITED STATES PATENT OFFICE 2,396,151

TIE ROD COUPLING

John H. Brenner and Lewis Slama, Humboldt, Nebr.

Application November 3, 1944, Serial No. 561,795

3 Claims. (Cl. 287—90)

This invention relates to tie rod couplings.

An object of this invention is to provide in a tie rod coupling a safety means forming part of the coupling to prevent the ends of the coupling from becoming disconnected when they become worn or damaged in any other respect.

Another object of this invention is to provide a tie rod coupling of this kind embodying a ball joint including a two-part seat for the ball and a spring for holding the seat parts in contact with the ball, one of the seat parts and the ball being so constructed and arranged as to prevent complete separation of the ball and the seat parts so that in the event the holding means for the seat parts becomes damaged or worn to an extent whereby the seat parts may work loose, such parts will be retained on the ball so that the coupling or joint may be subsequently repaired without replacement of the parts.

With tie rod couplings at present in use when both the ball and ball seat wear, the coupling will separate and as this coupling is a vital part of the steering structure, the separation of the coupling parts leaves the vehicle out of the control of the driver. It is, therefore, a further object of this invention to provide a coupling wherein the parts cannot separate when unduly worn so that the vehicle will never get out of the control of the driver.

To the foregoing objects, and others which may hereinafter more fully appear, the invention consists of the novel construction, combination and arrangement of parts, as will be more specifically referred to and illustrated in the accompanying drawing, but it is to be understood that changes, variations, and modifications may be resorted to which fall within the scope of the invention as claimed.

In the drawing:

Figure 1 is a detail bottom plan of a tie rod coupling constructed according to an embodiment of this invention, the dust cap being removed.

Figure 2 is a sectional view taken on the line 2—2 of Figure 1.

Figure 3 is a sectional view taken on the line 3—3 of Figure 2.

Referring to the drawing, the numeral 10 designates generally a steering arm which is formed with a boss 11 with which a tie rod 12 is adapted to be connected. The tie rod 12 is disposed at right angles to the steering arm 10 and the coupling between the steering arm and the tie rod is a substantially universal coupling. The tie rod 12 includes an elongated rod member 13 which is formed at one end thereof with a cylindrical housing 14. The housing 14 is provided with a threaded opening 15 by means of which a lubricant may be forced into the interior of the housing and normally the threaded opening 15 is closed by means of a threaded plug 16. The housing 10 has mounted therein a ball 17 which has formed integral therewith a tapered stud 18, engaging within the boss 11 and tightly secured within the tapered bore 19 of the boss 11 by means of a holding nut 20. The nut 20 is threaded onto a reduced diameter threaded stud 21 extending from the small end of tapered stud 18. Tapered stud 18 is connected with the ball 17 by means of a reversely tapered connecting stud 22. Ball 17 is adapted to engage a ball seat member 23 which is positioned within the housing 14, and housing 14 is provided with an annular flange 24 against which seat member 23 engages.

A second ball seat member 25 is positioned within the housing 14 and bears against ball 17 oppositely from seat 23. Ball seat member 25 includes an annular flange 26, having an outwardly pressed ball seat 27, and the seat 27 is formed with an elongated opening 28. A key 26a carried by flange 26 engages in a keyway 26b formed in housing 14 so that seat member 25 will be held against turning and with the long axis of opening 28 lengthwise of rod 13. A spring 29 bears at one end against flange 26 and at the other end bears against an annulus 30.

The adjacent end of the housing 14 is crimped or otherwise upset, as indicated at 32, so as to retain annulus 30 within housing 14. In order to provide a means whereby the two seat members 23 and 25 will be retained on the ball 17 in the event annulus 30 becomes disengaged from housing 14, I have provided a threaded stud 33 which is formed integral with ball 17 and has a nut 34 threaded thereon. The end of stud 33 is upset, as indicated at 35, so that when nut 34 is on stud 33, nut 34 will be held against unthreading. Normally nut 34 is positioned in spaced relation with respect to ball seat member 27, so that stud 33 may freely swing in the chamber 36 formed between seat member 25 and washer 30.

A dust cap 37 is formed integral with annulus 30 and includes a cylindrical side wall 38 having an outer diameter less than the outer diameter of the annulus to thereby form a shoulder 39 against which the crimping 32 is adapted to bear. At the opposite end housing 14 is formed with a second rabbet 40 on which a cap 41, having an annular flange 42, frictionally engages. Cap 41 is formed with a large central opening 43 through which stud 22 loosely engages, the opening 43 being large enough so as to permit free swinging movement of stud 22 with respect to cap 41.

Flange 24 of housing 14 is formed with an elliptical opening 44, having the long axis thereof extending lengthwise of rod 13, so that the greatest movement of stud 22 may be in the plane of the longitudinal axis of rod 13. A dished dust washer or cover 45 loosely engages over the outer end of cap 41, the concave side of cover 45 being innermost and cover 45 is formed with an opening 46 through which stud 22 loosely engages. As stud 22 rocks with respect to seat 23, cover 45 will move therewith, the outer diameter of cover 45 being substantially larger than the diameter of opening 43 of cap 41. A gasket 47 is interposed between the adjacent end of boss 11 and the convex side of cover 45.

In the use and operation of this tie rod coupling, tapered stud 18 is secured by means of the nut 20 in tapered opening 19 of boss 11. Tie rod 12 and steering arm 10 may rock one relative to the other with ball 17 rocking on the seat members 23 and 25. Spring 29 will hold outer seat member 25 in contact with ball 17 and hold ball 17 against seat 23. In the event the coupling should become damaged and ring 30 should become disengaged from housing 14, the two seat members 23 and 25 will be retained in engagement with ball 17 by means of nut 34. Under normal conditions nut 34 is spaced from seat member 25, but when washer 30 becomes disengaged from housing 14 the seat members will be held in operative engagement with ball 17 and downward force on tie rod 12 will not effect a separation of housing 14 from ball 17. This coupling provides a safety factor for the joint between a tie rod and a steering arm or other element so that the coupled elements will not become separated in the event such elements become loosened. In the event the ball 17 and the seat 23 should become so worn that the ball can completely separate from housing 14, ball 17 will slip through worn seat 23, seat 25 will move upwardly against seat 23, and nut 34 will then hold ball 17 against complete separation inasmuch as nut 34 cannot slip through slot 28 in seat 25. The coupling hereinbefore described, therefore, provides a safety factor which will prevent the vehicle from getting out of control by damage or wear to the tie rod coupling.

What is claimed is:

1. A tie rod coupling comprising a rod, a housing at one end of said rod, a flange carried by said housing, a ball seat in said housing engaging against said flange, a ball engaging against said seat, a tapered stud extending from said ball, a second seat in said housing engaging said ball oppositely from said first seat, a spring constantly urging said second seat toward said ball, a second stud carried by said ball oppositely from said tapered stud, and a seat retaining member on said second stud for holding said second seat against removal.

2. A tie rod coupling as set forth in claim 1 wherein said second stud is threaded and said retaining member comprises a nut threaded onto said second stud.

3. A tie rod coupling as set forth in claim 1 wherein the outer end of said second stud is upset to hold said retaining member against outward movement.

JOHN H. BRENNER.
LEWIS SLAMA.